March 2, 1954 R. J. GINTHER ET AL 2,670,973
SHAFT SEAL
Filed April 11, 1952

Russell J. Ginther,
Frank J. Bognar,
Inventors.
Koenig and Pope,
Attorneys.

Patented Mar. 2, 1954

2,670,973

UNITED STATES PATENT OFFICE 2,670,973

SHAFT SEAL

Russell J. Ginther and Frank J. Bognar, St. Louis, Mo.; said Bognar assignor to said Ginther Application April 11, 1952, Serial No. 281,762

3 Claims. (Cl. 286—9)

This invention relates to shaft seals and more particularly to seals for pump shafts.

Among the several objects of the invention may be noted the provision of an improved shaft seal readily applicable to existing pumps as well as to new pumps or the like; the provision of an improved shaft seal in which sealing pressure is derived from a source of fluid under pressure, such as compressed air; the provision of a shaft seal which, while having a minimum of parts subject to wear, provides a tight seal against leakage and in which wear is taken up by the pressure of the seal-actuating fluid; and the provision of a shaft seal of the class described which is easy to install and which is reliable in operation and has a relatively long useful life. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

Figure 1:
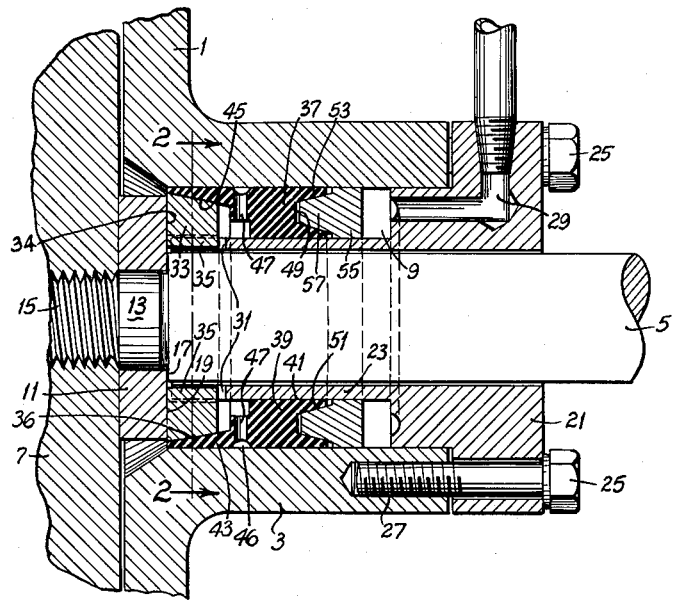
Figure 2:
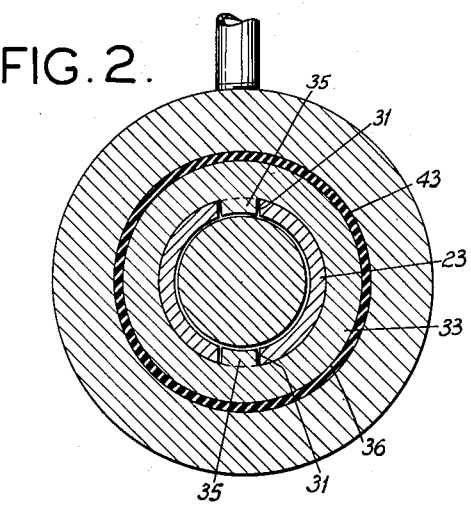

In the accompanying drawing, in which one of various possible embodiments of the invention is illustrated, Fig. 1 is a longitudinal section of a shaft seal of this invention; and, Fig. 2 is transverse section taken on line 2—2 of Fig. 1.

Corresponding reference characters indicate corresponding parts throughout the several views of the drawing.

Referring to the drawing, there is shown at 1 a portion of a pump casing having a hollow open-ended cylindrical shaft housing 3. The pump shaft 5 extends through this housing. Threaded on the inner end of the pump shaft is the pump impeller 7. These pump elements are generally conventional, and no further description is believed necessary except to state that the internal diameter of the housing 3 is larger than the diameter of the shaft 5 so that there is considerable annular space constituting a chamber 9 around the shaft within the housing which receives the elements of the shaft seal of our invention.

Included among the elements of our new shaft seal is a hard seal ring 11 which is fixed to and hence rotates with the shaft at the inner end of the chamber 9. As herein illustrated, the ring 11 is fixed to the shaft by being mounted on a reduced-diameter portion 13 of the shaft adjacent its inner threaded end 15 and is compressed between the shaft shoulder 17 at the root of portion 13 and the impeller 7 threaded on 15. Other suitable ways of fixing the ring on the shaft will readily suggest themselves. We prefer to make the ring 11 of stainless steel with a hard outer wearing face 19, such as Stellite, and it will be understood that the ring may be made of other suitable materials.

Further included among the elements of our new seal is a head 21 for closing the outer end of the cylindrical housing 3 having an integral sleeve 23 extending into the housing receiving the pump shaft 5. The head is fixed to the housing by screws 25 threaded into tapped holes 27 in the outer end of the housing. The head preferably has a precision fit with the end of the housing to avoid any necessity for use of a gasket between the head and the end of the housing, but such a precision fit may be dispensed with and a gasket used to provide a sealed connection as between the head and housing. The internal diameter of the sleeve is greater than the diameter of the pump shaft so that there is a substantial clearance between these parts (for example, $\frac{1}{32}$" clearance on the radius). The length of the sleeve is such that its inner end is closely adjacent but not in contact with the ring 11 (for example, being spaced $\frac{1}{16}$" from the ring 11). We prefer to make the head 21 and its integral sleeve 23 of stainless steel and it will be understood that any other suitable material may be used. The head 21 is provided with an inlet port 29 for admitting fluid under pressure (compressed air, for example) to the chamber 9.

The sleeve 23 at its inner end has a pair of diametrically opposite axial keyways 31 formed by axially slotting the sleeve. Axially slidable on the sleeve is a sealing ring 33 having its inner face 34 in running sealing engagement, as will be later made clear, with the outer wearing face 19 of the ring 11 on the shaft. The ring 33 is held against rotation, while being axially slidable on the sleeve, by having integral keys 35 slidable in the keyways 31. We prefer to make the ring 33 a carbon ring. The internal diameter of the ring 33 is greater than the external diameter of the sleeve 23 so that there is a substantial clearance between these parts (for example, $\frac{1}{32}$" clearance on the radius). The periphery of the ring is made frusto-conical, as indicated at 36, convergent outward.

Backing the carbon ring 33 is a packing ring 37 which is made of a solid deformable material preferably having, even when dry, a low coefficient of friction. The packing ring 37, as illustrated, is generaly of cup-shape, having a base or main body portion 39 provided with a sleeve-receiving central opening 41 and an annular skirt or lip 43 extending inward from the base and surrounding the carbon ring 33. The internal surface of the extending skirt or lip 43 is made frusto-conical as indicated at 45 corresponding to the frusto-conical periphery 36 of the carbon ring. The skirt or lip 43 is longer in axial direction than the thickness of the carbon ring. The outer surface of the skirt 43 is coextensive with the outer periphery of the main body portion 39 of the packing ring 37. In the cylindrical exterior of the packing ring at the root of the wall or lip 43 is an annular groove 46, and radial relief ports 47 provide for communication from this groove to the interior of the ring. In the outer or rearward end face of the base 39 of the packing ring there is provided an annular groove 49 of wedge-shape in cross-section, providing inner and outer lips 51 and 53.

We prefer to make the packing ring of Teflon, which is a tetrafluorethylene polymer synthetic plastic. This is especially suitable for the purpose because in addition to having an extremely low coefficient of friction in respect to metal even when dry, it is substantially chemically inert. However, other suitable materials may be used.

Backing the packing ring is a follower ring 55 axially slidable on the sleeve 23. The follower ring has an annular nose 57 of wedge-shape in cross-section corresponding to and entered in the groove 49 in the base of the packing ring. The follower ring may be made of metal, such as steel or brass, or it may be made of any other suitable material, for example a chemically inert plastic material if necessary or desirable.

The operation of the seal is as follows:

Upon introduction of any fluid under pressure into the pressure chamber 9 through the inlet port 29 in the head 21, the follower ring 55, the packing ring 37 and the carbon ring 33 are driven to the left as viewed in Fig. 1 to effect pressure-sealing engagement as between the inner face 34 of the carbon ring and the outer wearing face 19 of the rotary ring 11 on the shaft 5. This seal is a rotary running seal. The follower ring 55 acts as a piston, its outer or right face being subjected to the fluid pressure. The pressure fluid will ordinarily be compressed air, but any other suitable pressure fluid, gas or liquid, may be utilized. For example, pressure may be developed in chamber 9 behind the follower ring 55 by connecting a container of compressed carbon dioxide gas to the inlet port 29.

With the carbon ring 33 engaging the ring 11, and with the follower ring 55 subject to fluid pressure in chamber 9, the follower ring exerts such force on the packing ring 37 that its forward skirt 43 is expanded outwardly by virtue of the wedging action of the frusto-conical surfaces 36 and 45 into sealing engagement with the internal surface of housing 3. Also, the nose 57 of the follower ring effects an inward deformation of the inner rear lip 51 of the packing ring into sealing engagement with the external surface of the sleeve 23 and an outward deformation or expansion of the outer rear lip 53 of the packing ring into sealing engagement with the internal surface of the housing 3.

Thus, seals are obtained between the non-rotary carbon ring 33 and the rotary ring 11, between the packing ring 37 and housing 3 at lips 43 and 53, and between the packing ring and sleeve at lip 51. The first of these is a running radial seal, the latter two are axial seals of considerable axial extent along the internal surface of the housing 3 and the external surface of the sleeve 23. The pressure fluid in chamber 9 (for example, air) is effectively excluded from the pump by reason of the provision of relief ports 47. Should any air leak past the seal at lip 53, it will be vented to atmosphere via groove 46, ports 47, the clearance space between the carbon ring and the sleeve, and the clearance space between the sleeve and the pump shaft. This is often important to avoid introduction of the seal-maintaining pressure into the pump system since this pressure may be higher than desired in the pump system. Also, in the case of air, for example, introduction of air into some pumps may cause them to become air-bound.

Upon wearing of the carbon ring 33, the wear is automatically taken up by the action of the pressure in the chamber 9 behind the follower ring 55 forcing the follower ring, packing ring 37 and carbon ring 33 toward the rotary ring 11. Here it is to be noted that with the packing ring made of Teflon, which has a low coefficient of friction with respect to metal even when dry, the packing ring can slide axially without breaking its sealing engagement with the internal surface of housing 3 and the external surface of sleeve 23.

In some cases where the pump is used for pumping liquid which does not result in formation of scale, the forward lip 43 of the packing ring 37 may be eliminated.

It will be understood that it is contemplated that the parts 21—23, 33, 37 and 55 may be sold as a unit for installation by the purchaser on a pump.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

We claim:

1. A seal for a shaft which extends out of a casing through a cylindrical opening of larger diameter than the shaft, comprising a head on the casing closing the outer end of the opening and receiving the shaft, a sleeve extending from the head into the opening, the shaft being rotary in the sleeve, the external diameter of the sleeve being less than the diameter of the opening to provide an annular space around the sleeve, a sealing ring rotary with the shaft adjacent the inner end of the sleeve, a packing ring slidable on the sleeve in said annular space, said packing ring being formed of solid, deformable material capable of sliding on the internal cylindrical surface of the casing in the opening and on the external surface of the sleeve, the packing ring having a main body portion wherein there is a sleeve-receiving central opening with an annular skirt projecting inward from the main body portion in the direction toward the rotary sealing ring, the outer surface of the skirt being coextensive with the outer periphery of the main body portion, a non-rotary sealing ring located in the skirt and slidable on the sleeve, the skirt and the non-rotary sealing ring having mutually engaging wedge surfaces for effecting radial expansion of the skirt into sealing engagement with the surface of the casing in the opening, the packing ring also having inner and outer annular lips projecting outward from its main body portion and adapted to be spread apart for sealing engagement of the outer lip with the surface of the casing in the opening and of the inner lip with the sleeve, a port being provided for introducing fluid under pressure into the annular space around the sleeve behind the packing ring for pressurewise forcing the packing ring and the non-rotary ring toward the rotary sealing ring and for effecting radial expansion of the skirt and spreading of the annular lips.

2. A seal as set forth in claim 1 wherein the packing ring is formed to hold the non-rotary ring spaced from the main body portion of the packing ring, and wherein the packing ring has at least one radial vent port from the space between the non-rotary ring and the main body portion of the packing ring to the outer periphery of the packing ring.

3. A seal as set forth in claim 1 further comprising a follower ring slidable on the sleeve backing the packing ring having means for entry between the lips to spread them apart.

RUSSELL J. GINTHER.
FRANK J. BOGNAR.

References Cited in the file of this patent

UNITED STATES PATENTS

| Number | Name | Date |
| --- | --- | --- |
| 1,851,076 | Ackerman | Mar. 29, 1932 |
| 2,220,771 | McHugh | Nov. 5, 1940 |
| 2,419,588 | Pasco | Apr. 29, 1947 |
| 2,467,312 | Jack | Apr. 12, 1949 |
| 2,503,086 | Albright | Apr. 4, 1950 |
| 2,606,779 | Jagger | Aug. 12, 1952 |

FOREIGN PATENTS

| Number | Country | Date |
| --- | --- | --- |
| 882,197 | France | Jan. 9, 1942 |